3,414,638
GRAFT COPOLYMER OF ETHYLENE/VINYL ACETATE AND POLYMERIZED VINYL CHLORIDE, STYRENE AND ACRYLONITRILE

Dietrich Hardt, Bonn, Herbert Bartl, Cologne-Stammheim, Wilhelm Göbel, Cologne-Flittard, and Karl Dinges, Cologne-Stammheim, Germany, assignors to Farbenfabriken Bayer Aktiengesellschaft, Leverkusen, Germany, a corporation of Germany
No Drawing. Filed Apr. 8, 1966, Ser. No. 541,127
Claims priority, application Germany, Apr. 22, 1965, F 45,876
4 Claims. (Cl. 260—878)

ABSTRACT OF THE DISCLOSURE

Copolymers having a K-value of 50 to 90 and based on the polymerization of styrene and acrylonitrile in a weight ratio of 6:4 to 8:2 in the presence of a graft copolymer of grafting substrate of a copolymer of ethylene and vinyl acetate and a grafting monomer of vinyl chloride.

---

This invention relates to moulding compositions based on elastic-thermoplastic graft copolymers exhibiting outstanding mechanical properties, more particularly high impact and notched impact strength, coupled with good processing properties and very great resistance to ageing.

It is known that, by mixing a rubber component, i.e. natural rubber or synthetic rubber with a resin component which, on its own, can only form hard and brittle polymers, for example polystyrene, it is possible to obtain synthetics which, although of the same hardness and dimensional stability as the hard and brittle component, show a much greater resistance to shock and impact.

It is also known that, by grafting a monomer, which on its own is only able to form hard and brittle polymers, on to polybutadiene, it is possible to obtain graft polymers which, when mixed with a resin component, for example with a copolymer of styrene with acrylonitrile, yield synthetics which, in addition to good hardness and dimensional stability exhibit a high resistance both to shock and impact.

Finally, it is also known that synthetics exhibiting good hardness and dimensional stability can be produced by grafting acrylic or methacrylic esters, together with styrene and acrylonitrile, on polybutadiene.

Unfortunately, all these impact-resistant synthetics whose elasticising component is built up of butadiene or isoprene, have the disadvantage that, over a given period of time, they undergo some deterioration in their good mechanical properties, because the carbon-carbon double bonds still present in them are affected by atmospheric oxygen, particularly under the influence of light and heat.

To overcome this disadvantage, synthetics have already been developed in which saturated, elastomeric polymers are used as the elasticising component, i.e. components in which no aliphatic carbon-carbon double bonds are present and which therefore do not age so readily. Components such as these include, for example, polybutylacrylate and polyvinyl isobutyl ether. If these polymers are mixed with a resin component, for example polystyrene, in suitable proportions, the resulting synthetics exhibit outstanding mechanical data after they have been processed, but at the same time frequently show marked orientation. The mechanical properties of such polymer mixtures are therefore governed to a large extent by the direction in which the material flows during processing.

It is also known that shock-resistant synthetics exhibiting high impact strength, can be obtained by grafting monomers, for example styrene or monomer mixtures, for example styrene/acrylonitrile, on to a polyacrylate, and by mixing the resulting graft polymers with a resin component, for example with a copolymer of styrene and acrylonitrile. In this case, too, the mechanical properties of the polymer mixtures are governed to a considerable extent by the direction in which the material flows during processing.

A process has now been found by which it is possible to produce thermoplastic graft polymers under suspension polymerization conditions, comprising polymerizing 15 to 50 parts by weight of a graft polymer (A) of ethylene/vinyl acetate copolymers and vinyl chloride with K-values of 50 to 90, comprising 30 to 75 parts by weight of ethylene/vinyl acetate copolymer and 25 to 70 parts by weight of polymerized vinyl chloride, in which case the ethylene/vinyl acetate copolymer may contain between 30 and 70% by weight of vinyl acetate, and 50 to 85 parts by weight of a mixture of styrene (B) and acrylonitrile (C) in a ratio by weight from 6:4 to 8:2.

Of particular interest are graft polymers of 20 to 40 parts by weight of a graft polymer (A) of ethylene/vinyl acetate copolymers and vinyl chloride with K-values of 50 to 90 which comprise 50 to 75 parts by weight of ethylene/vinyl acetate copolymer and 25 to 50 parts by weight of polymerized vinyl chloride, in which case the ethylene/vinyl acetate copolymer may contain 30 to 50% by weight of vinyl acetate, and 60 to 80 parts by weight of a mixture of styrene (B) and acrylonitrile (C) in a ratio by weight from 6:3 to 7.5:3.

The new graft polymers exhibit outstanding mechanical properties such as hardness, impact strength, notched impact strength and reduced flammability. These properties are determined in large measure by the ratio in which the components are used. Thus, polymers with an increasing quantity of graft polymer (A) in the reaction mixture, become increasingly softer, as shown by a decrease in their ball indentation hardness. At the same time, however, their impact strength and notched impact strength are increased.

The preparation of the graft copolymer (A) may occur according to British Patent 1,021,324.

In order to carry out the polymerization reaction, the ethylene/vinyl acetate/vinyl chloride graft polymer generally in the form of a bead or pearl polymer, is dissolved in a mixture of styrene and acrylonitrile, if desired with heating to 60° C., after which the solution is dispersed with vigorous stirring in water with the aid of a protective colloid following the addition of a monomer-soluble initiator. Polymerization to a bead or pearl polymer is then completed with further heating under the conditions of suspension polymerization.

It is also possible to prepare the polymer solution in the polymerization vessel and to introduce the monomer-soluble initiator following solution, which may be completed by increasing the temperature. This is followed by the addition of the aqueous phase with the protective colloid. In this case, too, the products resulting from the process according to the invention are obtained by vigorous stirring, followed by polymerization.

The two processes referred to above may be applied when the graft polymer (A) readily dissolves in the styrene/acrylonitrile mixture at room temperature or at temperatures of up to 60° C.

If the proportion of component (A) exceeds 10% by weight based on polymer A+styrene+acrylonitrile, and if component (A) cannot be homogeneously dissolved in the styrene-acrylonitrile mixture, it is advisable to adopt the following procedure:

Part of the total aqueous phase to be used, together with the pearl-form graft polymer (A) is briefly mixed in a reaction vessel equipped with stirring mechanism, either at room temperature or at a temperature not high enough to decompose the initiator used, and the resulting mixture is vigorously stirred for a prolonged period under the same conditions, with the solution of the initiator in the styrene/acrylonitrile mixture. As a result, the monomer mixture completely diffuses into the polymer particles which, despite a slight increase in volume, retain their shape and remain dispersed in the aqueous phase as individual particles. When diffusion of the monomer into the particles is complete, which may take from 5 to 15 hours, depending on the particle size, which may vary up to 5 mm.-diameter, and on the temperature, which may be from 20 to 80° C., preferably 20 to 50° C., the reaction vessel is heated to the polymerisation temperature while stirring is continued. On completion of polymerization, a solid bead- or pearl-polymer is obtained.

Another alternative method of preparing the graft polymers according to the invention, comprises dispersing an aqueous solution of the ethylene/vinyl acetate copolymer, together with a monomer-soluble initiator, in a mixture of styrene, acrylonitrile and vinyl chloride, and subjecting the resulting dispersion to suspension polymerization.

Suitable initiators include the conventional polymerisation initiators such as organic, monomersoluble peroxy compounds such as diisopropyl peroxy dicarbonate and readily decomposable azo-compounds such as diazodiisobutyronitrile, preferably in quantities from 0.05 to 2% by weight, based on the mixture to be polymerised.

The polymerisation temperatures are advantageously in the range from 20 to 80° C.

Molecular weight regulators, such as mercaptocompounds, halongenated hydrocarbons and ketones, may be added to the mixture to be polymerized, preferably in quantities of 0.5 to 10% by weight, based on the mixture.

Conventional protective colloids such as methyl cellulose, gelatin and polyvinyl alcohol, may be used for dispersing the mixture to be polymerized in the water phase, advantageously in quantities of 0.1 to 1% by weight, based on the aqueous phase.

The ratio by weight of aqueous phase to polymerizable mixture is preferably from 1:1 to 3:1.

The polymers comprise free-flowing beads which dissolve readily in tetrahydrofuran. These beads may be homogenized on heated rollers at temperatures of 100° C. to 180° C., to form rough sheets or finished sheets. The surface of the rolled product or of the pressed sheets is completely smooth. The thermoplastic products may be readily processed in extruders or injection-moulding machines into, for example, sheets, tubes, mouldings and profiles or films which, in general, are turbid but which can also be made transparent by increasing the ethylene/vinyl acetate copolymer component. Due to the presence of polyvinyl chloride, it is advisable to use stabilisers for polyvinyl chloride in cases where processing is accompanied by prolonged heating. Pigments and dyes may readily be incorporated during processing.

The conditions under which the polymers are produced and their mechanical properties are illustrated in the following examples:

Examples a–k

A mixture of 200 parts by weight of a 1% by weight solution of methyl cellulose in water, the graft polymer A and the styrene/acrylonitrile mixture to which lauroyl peroxide is added, are stirred for five hours at room temperature in a polymerisation vessel equipped with stirring mechanism and a reflux condenser, if desired in the presence of a regulator. Another 400 parts by weight of the methyl cellulose solution are then added, after which the temperature is raised to 60° C. with further stirring. The quantities used in each case together with the polymerisation times are listed in the table.

The bead polymers, can readily be suction-filtered, washed with water and dried in vacuo at 50 to 80° C. They are not cross-linked and are completely soluble in tetrahydrofuran. Their K-values were measured at 25° C. in tetrahydrofuran.

The same results are obtained when azodiisobutyronitrile is used as initiator. Where benzoyl peroxide is used as initiator, polymerisation is carried out at 70 to 75° C. under otherwise the same conditions.

The parts indicated in the table are parts by weight.

| Number | Graft polymer (A) (ethylene/vinyl acetate/vinyl chloride) | | | | (B) | (C) | | |
|---|---|---|---|---|---|---|---|---|
| | E-Vac Copolymer in parts | Percent by wt. Vac in E-Vac copolymer | Polymerised VC in parts | K-value of polymer (A) as measured in cyclohexanone at 25° C. | Quantity of (A) added in parts | Quantity of styrene added in parts | Quantity of ACN added in parts | Lauroyl peroxide in parts | Polymerisation time in hours |
| a | 62 | 30 | 38 | 67.0 | 90 | 147 | 63 | 1 | 13 |
| b | 39 | 30 | 61 | 89.6 | 60 | 168 | 72 | 1 | 16 |
| c | 52 | 66 | 48 | 79.3 | 60 | 168 | 72 | 1 | 16 |
| d | 52 | 66 | 48 | 79.3 | 45 | 178.5 | 76.5 | 1 | 16 |
| e | 62 | 45 | 38 | 79.3 | 90 | 147 | 63 | 1 | 25 |
| f | 60 | 45 | 40 | 74.2 | 75 | 157.5 | 67.5 | 2 | 15 |
| g | 56 | 45 | 44 | 81.1 | 120 | 126 | 54 | 0.5 | 16 |
| h | 60 | 45 | 40 | 74.2 | 60 | 168 | 72 | 2 | 15 |
| i | 39 | 45 | 61 | 77.0 | 90 | 147 | 63 | 1 | 22 |
| j | 74 | 45 | 26 | 75.8 | 60 | 168 | 72 | 2 | 17 |
| k | 60 | 45 | 40 | 63.3 | 60 | 192 | 48 | 2 | 11 |

| Number | Regulator | | Tensile strength DIN 53505 (kg./cm.²) | Ball indentation hardness Draft DIN 53505 (kg./cm.²) | | Notched impact strength DIN 53453 (cm. kg./cm.²) | | | Analysis of polymer from (A) (B) (C) | | K-value as measured in tetrahydrofuran at 25° C. |
|---|---|---|---|---|---|---|---|---|---|---|---|
| | Type | Parts | | 10″ | 60″ | 20° C. | 0° C. | −10° C. | Percent by wt. ACN | Percent by wt. E | |
| a | | | 300 | 810 | 750 | 13.1 | 8.3 | 3.6 | 15.7 | 33.5 | 102 |
| b | | | 607 | 1,465 | 1,370 | 1.9 | | | 20.8 | 22.6 | 92 |
| c | | | 663 | 1,475 | 1,370 | 2.9 | | | 19.9 | 22.1 | 127 |
| d | | | 706 | 1,570 | 1,470 | 12.5 | | | 21.7 | 17.7 | 122 |
| e | | | 351 | 850 | 875 | 27.8 | 3.7 | | 17.2 | 30.8 | 115 |
| f | MTM | 1.5 | | 875 | 805 | 23.0 | 10.8 | 3.1 | 19.3 | 27.4 | 121 |
| g | | | 393 | 575 | 520 | 33.4 | 23.9 | 4.0 | 16.8 | 22.7 | 135 |
| h | CCl₄ | 9 | 536 | 1,180 | 1,120 | 7.4 | | | 21 | 22.8 | 88.3 |
| i | | | 607 | 1,235 | 1,160 | 3.0 | | | 17.25 | 33.1 | 126.0 |
| j | | | 146/133 | 545 | 490 | 7.6 | 5.7 | 4.1 | 21 | 24.2 | 106.7 |
| k | CCl₄ | 18 | 581 | 1,280 | 1,190 | 1.7 | | | 16.1 | 28.8 | 81.8 |

Vac=vinyl acetate; VC=vinyl chloride; ACN=acrylonitrile; E-Vac=ethylene-vinyl acetate; MTM=tert. alkyl mercaptans (cf. Houben-Weyl, vol. 14/1, p. 323).

We claim:
1. A process of producing thermoplastic graft polymers comprising suspension polymerizing
   (A) 50 to 85 parts by weight of a mixture of styrene and acrylonitrile, the styrene and acrylonitrile being in a weight ratio of 6:4 to 8:2, in the presence of
   (B) 15 to 50 parts by weight of a graft copolymer of
      (i) a grafting substrate of 30 to 75 parts by weight of a copolymer of ethylene and vinyl acetate containing from 30 to 70% by weight vinyl acetate and
      (ii) 25 to 70 parts by weight of vinyl chloride, said graft copolymer having a K-value between 50 and 90.

2. The process of claim 1 wherein (A) comprises 60 to 80 parts by weight of a mixture of styrene and acrylonitrile, the styrene and acrylonitrile being in a weight ratio of 6:3 to 7.5:3 and (B) comprises 20 to 40 parts by weight of a graft copolymer of
   (i) a grafting substrate of 50 to 75 parts by weight of a copolymer of ethylene and vinyl acetate containing 30 to 50% by weight of vinyl acetate and
   (ii) 25 to 50 parts by weight of vinyl chloride.

3. A thermoplastic graft copolymer having a K-value of between 50 and 90, said graft copolymer comprising the polymerization product of
   (A) 50 to 85 parts by weight of a mixture of styrene and acrylonitrile, the styrene and acrylonitrile being in a weight ratio of 6:4 to 8:2 and
   (B) 15 to 50 parts by weight of a graft copolymer of
      (i) a grafting substrate of 30 to 75 parts by weight of a copolymer of ethylene and vinyl acetate containing from 30 to 70% by weight vinyl acetate and
      (ii) 25 to 70 parts by weight of vinyl chloride.

4. The thermoplastic graft polymer of claim 3 wherein (A) is 60 to 80 parts by weight of a mixture of styrene and acrylonitrile, the styrene and acrylonitrile being in a weight ratio of 6:3 to 7.5:3 and (B) is 20 to 40 parts by weight of a graft copolymer of
   (i) a grafting substrate of 50 to 75 parts by weight of a copolymer of ethylene and vinyl acetate containing 30 to 50% by weight of vinyl acetate and
   (ii) 25 to 50 parts by weight of vinyl chloride.

References Cited
UNITED STATES PATENTS

| | | | |
|---|---|---|---|
| 3,322,858 | 5/1967 | Coaker et al. | 260—878 |
| 3,358,054 | 12/1967 | Hardt et al. | 260—878 |

MURRAY TILLMAN, *Primary Examiner.*

M. J. TULLY, *Assistant Examiner.*